US006158110A

United States Patent [19]

Takacs

[11] Patent Number: 6,158,110

[45] Date of Patent: Dec. 12, 2000

[54] BEARING INSTALLER/REMOVER AND METHOD

[76] Inventor: John Takacs, 519 May Valley Dr., St. Louis, Mo. 63026

[21] Appl. No.: 09/110,778

[22] Filed: Jul. 6, 1998

[51] Int. Cl.[7] .................. B23P 19/04

[52] U.S. Cl. .................. 29/724; 29/259

[58] Field of Search .................. 29/264, 266, 724, 29/260, 256, 257, 244, 259, 265, 898.07, 898.08

[56] References Cited

U.S. PATENT DOCUMENTS

| | | | |
|---|---|---|---|
| 1,446,102 | 2/1923 | Oldershaw | 29/260 |
| 1,459,269 | 6/1923 | Ullman | 29/260 |
| 1,472,759 | 10/1923 | Huntington | 29/260 |
| 2,031,998 | 2/1936 | Bliss | 29/265 |
| 2,290,427 | 7/1942 | Harrington | 29/265 |
| 3,887,989 | 6/1975 | Maynard | 29/898.08 |
| 4,476,617 | 10/1984 | Kobylarz | 29/264 |
| 4,694,569 | 9/1987 | Colvell et al. | 29/264 |
| 4,769,890 | 9/1988 | Maynard | 29/266 |
| 5,165,169 | 11/1992 | Boyce | 29/898.08 |
| 5,255,435 | 10/1993 | Shultz | 29/898.08 |
| 5,408,733 | 4/1995 | Blankenship | 29/266 |

*Primary Examiner*—I. Cuda
*Assistant Examiner*—Marc W. Butler
*Attorney, Agent, or Firm*—Folster, Lieder, Woodruff & Lucchesi, L.C.

[57] ABSTRACT

A bearing installer/remover, for installing and removing a bearing from a panel having a bearing seating passage through it, has a bridge with integral legs engaging a panel surface and straddling the bearing. The bridge has a threaded hole in it. The bearing is positioned between the bridging piece and the head of a bolt which has a threaded shaft threaded through the bridge hole. A cylindrical collar is mounted on the bolt shaft between the bolt head and the bearing, and a cylindrical bushing, preferably integral with the collar, fits closely but slidably around the bolt shaft between the collar and the bearing, and extends through the bore of the bearing, whereby the bearing is restrained against cocking.

10 Claims, 4 Drawing Sheets

BEARING INSTALLER/REMOVER AND METHOD

CROSS-REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

This invention relates to devices for installing and removing ball bearings, and more particularly mounting and removing of ball bearings into wheel hubs, pulleys, conveyors and the like. Frequently these bearings are of a flange type, and the device is shown and described as applied to a flange type bearing, but the flange itself plays no role in the construction or operation of the device. Traditionally, this type of bearing was installed by cutting a circular hole in the surface to which the bearing was to be installed, holding the bearing in place manually, and mounting the bearing by impacting it, typically with a bronze bar being struck with a hammer. This type of installation requires a good deal of skill, and even those skilled in installation of flange bearings have damaged bearings because the bronze bar was not centered upon the inner race of the bearing when it was struck. Another problem inherent in the use of a bronze bar and hammer is that when the bearing is close to an obstruction, it is difficult to maneuver the bar and hammer to hit the bearing squarely.

BRIEF SUMMARY OF THE INVENTION

Briefly stated, an improved flange bearing installer is provided. The bearing installer of the present invention allows the individual installing the bearings to easily and quickly install the bearings without the risk of damaging the bearings. Simply stated, the bearing installer and remover comprises a bolt with a head and threads covering at least an end portion of the bolt, a bridge with a top face or surface with a threaded hole in the bridge top face, and an engaging surface. An abutting part, which is either a cylindrical collar, a cylindrical collar and a bushing, a cylindrical collar and bushing integrated part, or a toggle bolt nut, engages the inner race of a flange bearing and urges the flange bearing into (for installation) or out of (for removal) a substrate such as a wall or panel. The abutting part moves in a direction determined by the hand of the threads of the shaft of the bolt, and the direction in which of the head of the bolt is rotated.

DETAILED DESCRIPTION OF THE INVENTION

Figure 1:
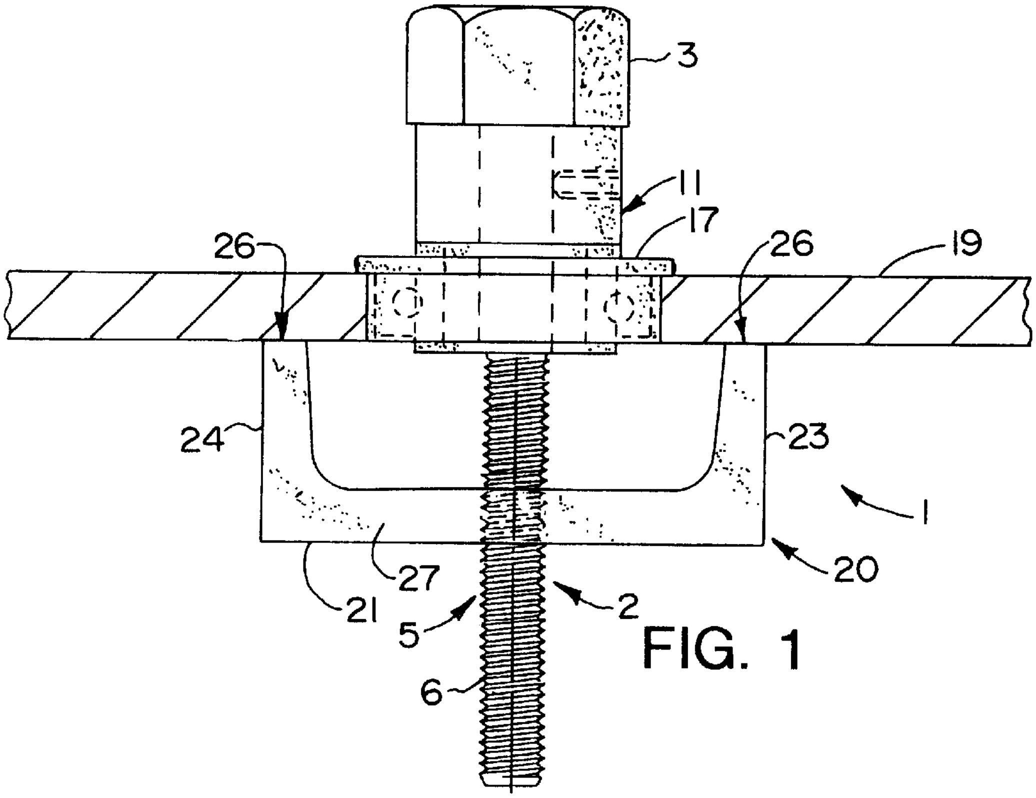
FIG. 1 is a view in side elevation of an assembled flanged bearing installer and remover in the final stage of installation.

In the drawings, FIG. 1 is an assembled bearing installer/remover of the present invention. The bearing/installer remover comprises a bolt 2, an abutting part such as bushing 10 and collar 11, and a bridge 20. The bolt 2 includes a preferably conventional hexagonal bolt head 3, and a shaft 5. The shaft 5 of machine bolt 2 has a threaded portion 6 at a free end thereof, and a smooth portion 7 between the threaded portion 6 and the bolt head. The bolt 2 is preferably made from a high strength steel, so that it will not bend or deform under moderate pressure. A generally cylindrical collar 11 has a central hole 12 that fits closely but slidably around shaft 5, and rests on smooth portion 7 of shaft 5. Collar 11 fits against the bolt head 3 of bolt 2. In the preferred embodiment of the present invention, a threaded hole 16 is positioned transverse to the axis of the central hole 12, and extends from the outside wall of collar 11 through the wall of the central hole 12. Set screw 14 is threaded to be complementary to threaded hole 16, and secures collar 11 to bolt 2.

A generally cylindrical bushing 10 has a similar central hole 13 that fits around shaft 5 and rests on smooth portion 7 of shaft 5. Bushing 10 fits against collar 11. In the preferred embodiment, a threaded hole 15 is positioned transverse to the central hole 13 of bushing 10 in a manner analogous to the transverse threaded hole 16 of collar 11. A set screw (not shown, but similar to set screw 14) likewise secures bushing 10 to bolt 2.

A flange bearing 17 fits over bushing 10, and abuts collar 11. Bushing 10 is selected from a group of bushings sized to fit the internal diameters of standard sleeve bearings. A standard flange bearing 17 has an inner race 18 and an outer race 25. The most common reason for bearing installation damage is the inadvertent striking of the outer race 25 of the bearing 17 with a bronze bar. If the outer race 25 is accidentally struck, it becomes deformed and the internal ball or roller bearings no longer move across an even, circular path. The damage to the bearing case may not be readily apparent. The internal roller or ball bearings then wear unevenly, and fail prematurely. Collar 11 is therefore selected from a group of collars that is sized to abut the inner race 18 of bearing 17, without contacting the outer race 25 of bearing 17. In this manner, no damage to the outer race occurs, and the installation of the sleeve bearing is accomplished without waste.

Figure 7:
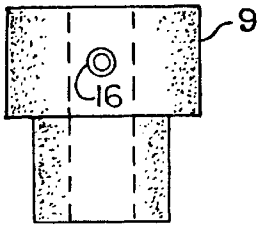
FIG. 7 is a view in side elevation of the bushing and collar of FIG. 6.
Figure 8:
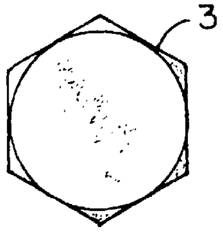
FIG. 8 is a top plan view of a machine bolt of the present invention.
Figure 9:
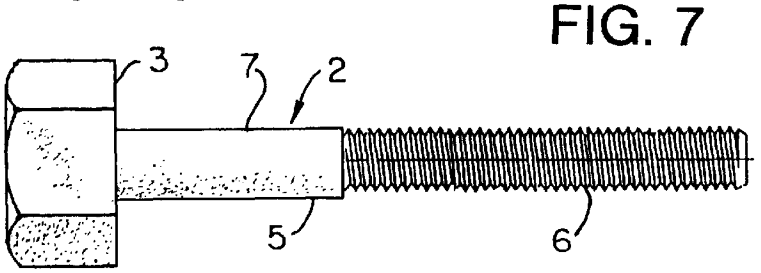
FIG. 9 is a view in side elevation of the machine bolt of FIG. 8.
Figure 10:
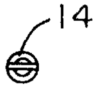
FIG. 10 is a top plan view of a set screw.
Figure 11:
FIG. 11 is a view in side elevation of a set screw.

Referring now to FIG. 7, the bushing and collar may be formed as a single piece, such as unitary bushing and collar 9. As with the single piece collar and bushing, a variety of diameter sizes are provided to match the sizes of flange bearings to be installed or removed. The smaller diameter part of the unitary piece 9 is thus sized to fit within a flange bearing, while the larger diameter part of the unitary piece 9 is sized to abut the inner race of a flange bearing.

In the preferred embodiment, bridge 20 has a bridging piece 27 with a top face 21 and an engaging surface 26. The engaging surface 26 is formed to provide a substantially flat surface against which the installation surface bears. In the preferred embodiment, the engaging surface 26 is at the underside of two legs 23 and 24. Legs 23 and 24 are preferably formed with a gradual taper from a wider portion at the bridging piece 27 to a narrower portion at the engaging surface 26. This taper in the legs 23 and 24 provides for easier maneuvering of bridge 20 in constricted installation spaces. The bridge 20 is formed such that the top face 21 is spaced from the engaging surface 26 and held parallel to a substrate 19. The substrate 19 has a pre-formed hole sized to accommodate a flange bearing.

Figure 16:
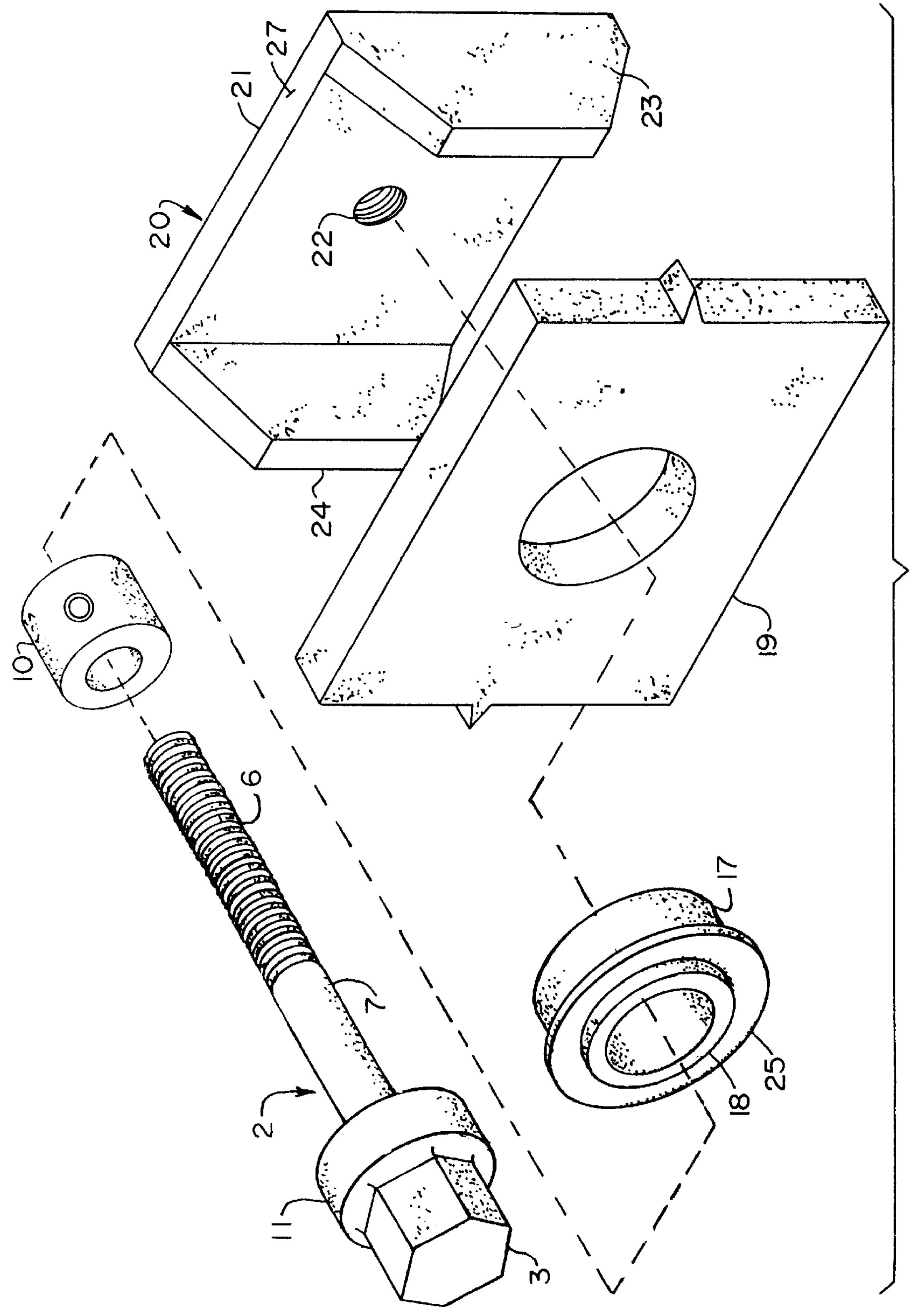
FIG. 16 is an exploded view of one embodiment of the skirted bearing installer.
Figure 17:
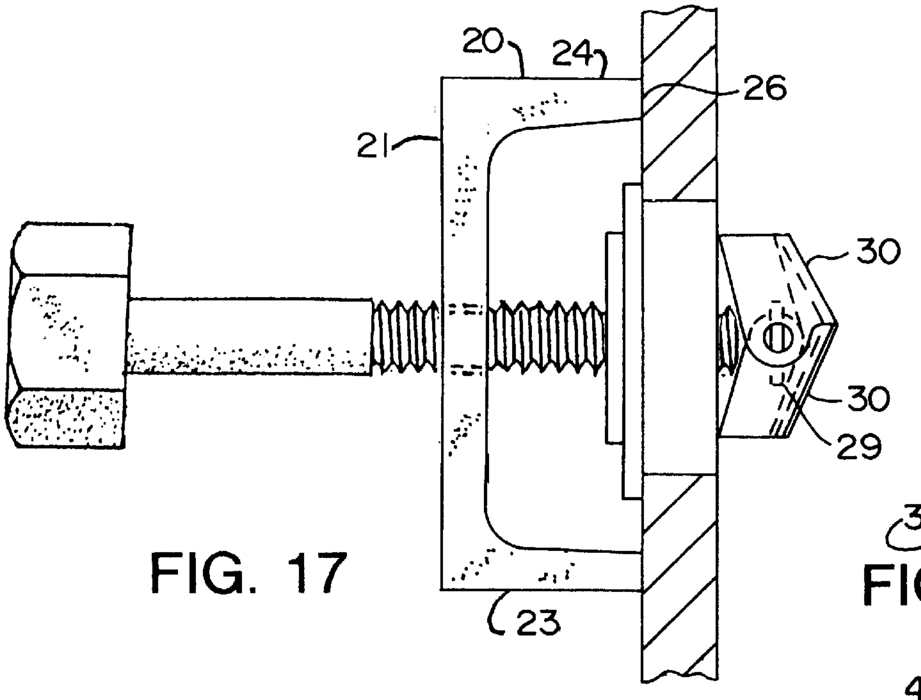
FIG. 17 is a view in side elevation of an alternative embodiment of a bearing installer and remover in a stage of removal.
Figure 24:
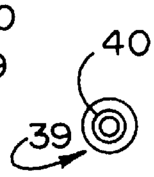
FIG. 24 is a top plan view of a wing nut stem.
Figure 25:
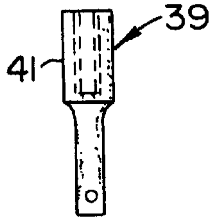
FIG. 25 is a view in side elevation of the wing nut stem shown in FIG. 24.
Figure 18:
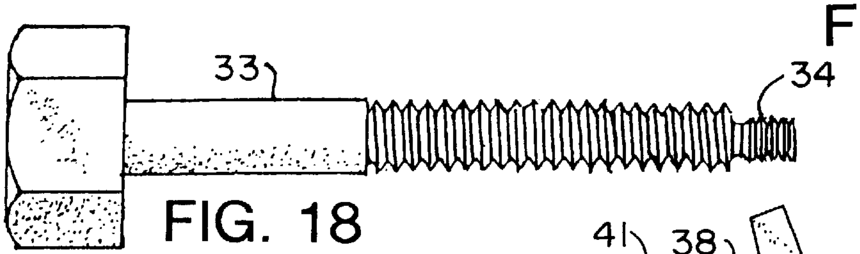
FIG. 18 is a view in side elevation of an alternative embodiment of a bolt of a bearing installer and remover.

Referring to FIG. 1 and FIG. 16, installation of a flange bearing is accomplished by placing an appropriate collar 11 over the bolt shaft 5 until the collar 11 engages the bolt head 3, placing an appropriate bushing 10 over the bolt shaft 5 until bushing 10 engages collar 11, placing a flange bearing 17 over the bolt shaft 5 until flange bearing 17 fits around bushing 10 and engages collar 11 with the flanged side of flange bearing 17 abutting collar 11, positioning the bridge 20 over a pre-formed hole in a substrate 19 such that engaging surface 26 rests on substrate 19, and threading the bolt shaft 5 through threaded hole 22 in bridge 20. Finally, the bearing is drawn into the hole in the substrate by tightening the bolt head with a wrench. A socket wrench, box wrench or power socket wrench may be employed to secure the bearing to the substrate. The hole in the substrate is slightly undersized with respect to the outer diameter of the bearing, so as to provide a friction fit of the bearing in the substrate.

Figure 2:
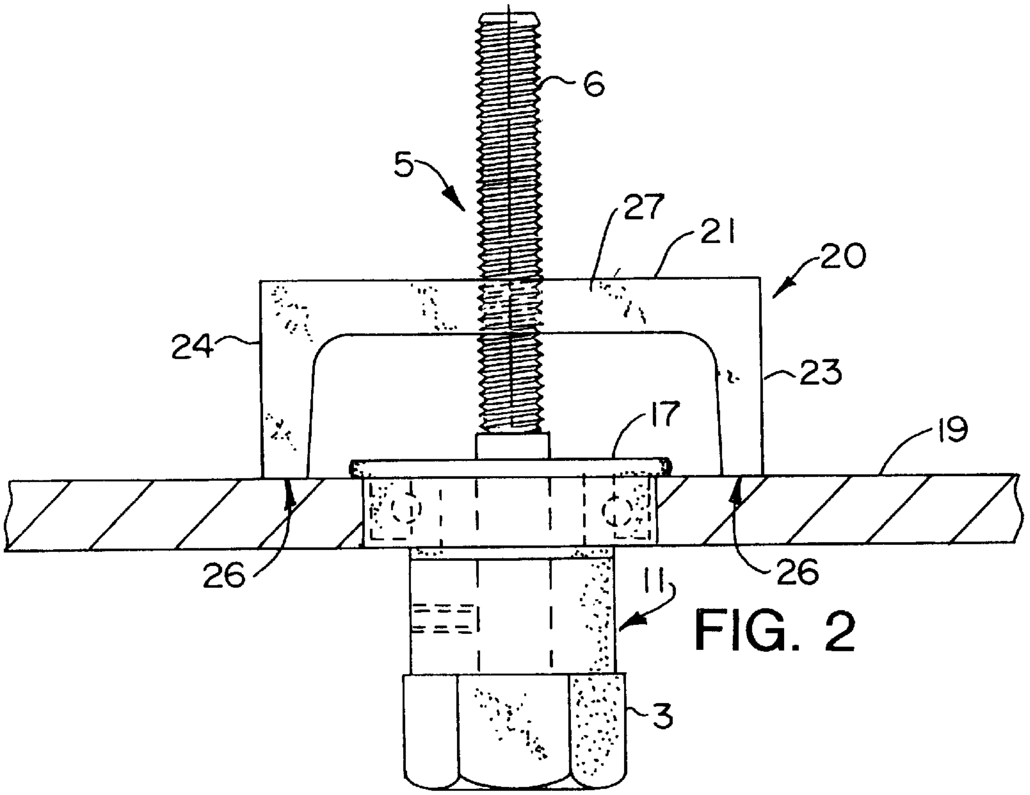
FIG. 2 is a view in side elevation of an assembled skirted bearing installer and remover in the initial stage of removal.
Figure 3:
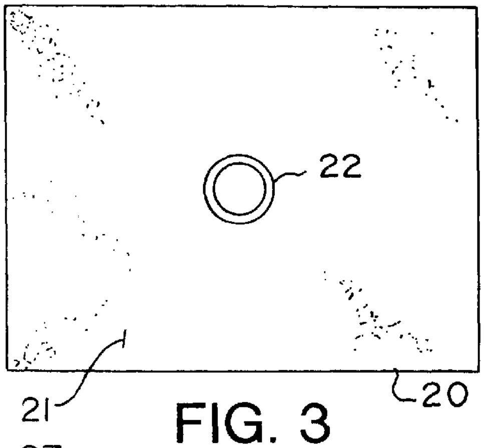
FIG. 3 is a top plan view of a bridge of the present invention.
Figure 4:
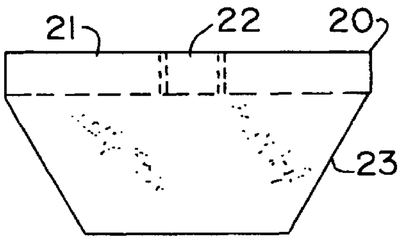
FIG. 4 is a front view of the bridge of FIG. 3.
Figure 5:
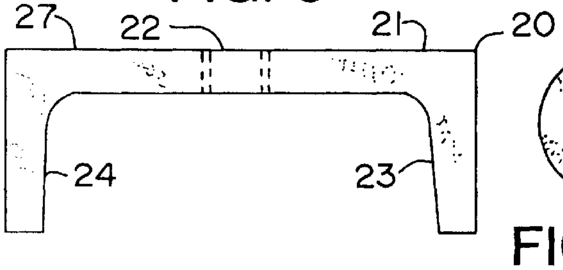
FIG. 5 is a view in side elevation of the bridge of FIG. 3.
Figure 12:
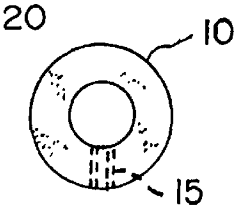
FIG. 12 is a top plan view of a bushing of the present invention.
Figure 6:
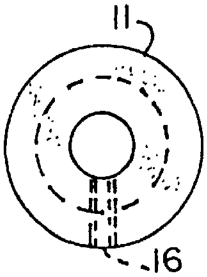
FIG. 6 is a top plan view of a bushing collar of the present invention.
Figure 14:
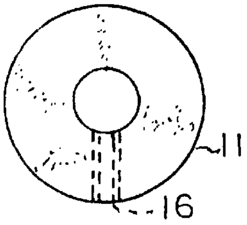
FIG. 14 is a top plan view of a collar of the present invention.
Figure 15:
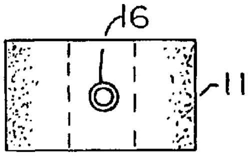
FIG. 15 is a view in side elevation of the collar of FIG. 14.
Figure 13:
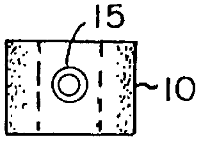
FIG. 13 is a view in side elevation of a bushing of the present invention.

Referring to FIG. 2, removal of a flange bearing from a substrate is performed by placing an appropriate collar 11 over the bolt shaft 5 until the collar 11 engages the bolt head 3, placing an appropriate bushing 10 over the bolt shaft 5 until bushing 10 engages collar 11, positioning the bridge 20 over the flanged side of the flange bearing to be removed, threading the threaded part 6 of bolt shaft 2 through the threaded hole 22 of bridge 20 from the side of the substrate opposite bridge 20 until the bushing 20 passes through the flange bearing and the collar 11 abuts the inner race of the flange bearing, and finally tightening the bolt head with a wrench until the flange bearing is urged out of its position in the substrate.

In an alternative embodiment of the present invention, referring to FIGS. 17–22, the bolt 2 is threaded to a toggle bolt nut 29. Toggle bolt nut 29 is comprised of flange wings 30, biasing spring 31 and nut 32. Biasing spring 31 encourages flange wings 30 into an extended position, but allows flange wings 30 to collapse toward bolt shaft 5 of bolt 2 when the flange wings 30 are passed through the center of a flange bearing and through the precut hole in the substrate 19.

Figure 23:
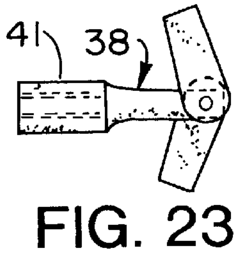
FIG. 23 is a modified flange wing nut of an alternative embodiment of a bearing installer and remover of the present invention.
Figure 19:
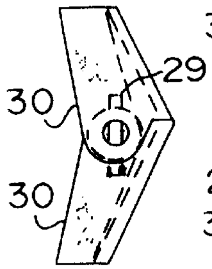
FIG. 19 is a view in side elevation of a flanged wing nut of FIG. 17.
Figure 20:
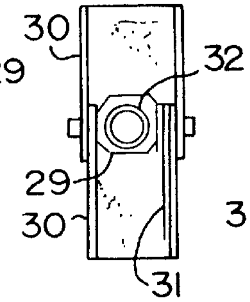
FIG. 20 is a bottom plan view of the flanged wing nut of FIG. 19.
Figure 21:
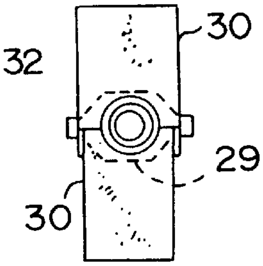
FIG. 21 is a top plan view of the flanged wing nut.

Referring to FIG. 23, a modified toggle bolt nut 38 may be employed. Modified toggle bolt nut 38 includes boss 39 with an internally threaded hole 40. Boss 39 is substantially cylindrical at its base 41. Cylindrical base 41 of boss 39 performs a similar function to bushing 10 in that base 41 fits within the center of a flange bearing.

In this alternative embodiment, the extended wing flanges 30 of toggle bolt head 29 act as the abutting part, and are sized to fit against the inner race 18 of a flange bearing 17, but are sized to be short enough so as not to engage the outer race 25 of bearing 17. The size of the flange wing to be used with a particular flange bearing is determined by the distance from one extreme end of one extended flange wing to the other extreme end of the opposite flange wing. This distance is a distance between the inner diameter of the inner race of the flange bearing and the diameter of the outer race of the flange bearing, so that the wings 30 contact the inner race of the flange bearing but do not contact the outer race of the flange bearing.

Figure 22:
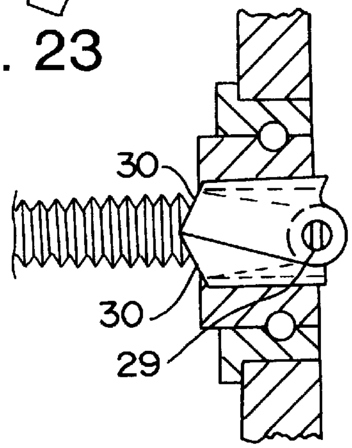
FIG. 22 is a cutaway of an alternative embodiment of a bearing installer and remover in an initial stage of removal.

Referring to FIG. 22, installation of a flange bearing into a substrate using this alternative embodiment is accomplished by first threading the bolt 2 through the hole 22 in bridge face 21 of bridge 20 in a direction toward the engaging surface 26 of bridge 20, with the bolt head positioned over the bridge face 21, then threading a toggle bolt 29 or modified toggle bolt 38 onto shaft 5 of bolt 2 in a direction underneath top face 21 and inside legs 23 and 24 of bridge 20, with the underside of toggle bolt 29 or modified toggle bolt 38 facing the underside of bridge face 21, then placing the bridge 20 on the same side of substrate 19 as the bolt head 3, passing the toggle bolt 29 or modified toggle bolt 38 through the precut hole in the substrate 19, then passing a flange bearing through the flange wings 30 of toggle bolt 29 or modified toggle bolt 38 in an orientation so that the flanged side of the flange bearing faces the underside of the toggle bolt 29 or modified toggle bolt 38, on the side of the substrate 19 opposite the bridge, and tightening the bolt 2 by rotating the bolt head 3 with an appropriate wrench, thus urging the toggle bolt 29 or modified toggle bolt 38 toward the inner race of flange bearing and pulling the flange bearing securely into the precut hole of substrate 19. After the bearing is installed, the bolt must be rotated until the wings can be folded together manually. The wings thus folded are withdrawn through the hole or bore of the bearing.

Removal of the flange bearing is accomplished in a similar manner, first by threading the bolt 2 through the top face 21 of bridge 20 in a direction such that the shaft 5 threads toward the engaging surface 26 of bridge 20, then threading the toggle bolt head 29 or modified toggle bolt head 38 onto the end of shaft 5 of bolt 2, then passing the toggle bolt head 29 or modified toggle bolt head 38 through preinstalled flange bearing 17 so that flange wings 30 of toggle bolt head 29 or modified toggle bolt head 38 open on the side opposite the flange side of the flange bearing, then rotating the bolt head 3 of bolt 2 with an appropriate wrench such that the toggle bolt head 29 or modified toggle bolt head 38 engages the inner race 18 of flange bearing 17 and urges flange bearing out of substrate 19.

Numerous variations in the construction of the bearing installer of this invention will occur to those skilled in the art in the light of the foregoing disclosure. By way of example, the bolt, collar and bushing may be formed in one piece rather than as separate pieces. Likewise, the collar and bushing may be one piece, and the bolt a separate piece. The bridge may be cylindrical or frustoconical, having a continuous, round or elliptical engaging surface. The top face of the bridge need not be a flat plane surface, as long as the axis of the threaded hole is held parallel to the center line of the bearing. These examples are merely illustrative.

What is claimed is:

1. A bearing installer/remover for installing and removing a bearing from a panel having a bearing seating passage through it, said bearing having inner and outer races and a bore through the inner race, comprising:

a bridge, said bridge having a central bridging piece with a top face and, integral with said central bridging piece, depending legs, each with a panel-engaging surface opposite the top face, the engaging surfaces being adapted to engage a surface of said panel astride said bearing and being spaced from and parallel to the top face of the bridging piece and the central bridging piece having a threaded hole therethrough, perpendicular to said top face;

a bolt including a shaft and a head, at least a portion of the shaft being threaded with a thread sized complementarily to the threaded hole in the bridging piece and threaded therethrough, said bearing being positioned between the bolt head and the bridging piece;

a cylindrical collar, said collar having a passage with a diameter closely but slidably to receive said bolt shaft, said collar being mounted on said bolt shaft between said bolt head and said inner race and adapted flatly to engage a radial face of said bearing, and a cylindrical bushing with an outside diameter sized to fit closely but slidably within the bore of said bearing and an inside diameter to fit closely but slidably around said bolt shaft, said bushing being mounted on said bolt shaft between said collar and said bridging piece and extending through the bore of said bearing, whereby the bearing is restrained against cocking.

2. The bearing installer/remover of claim 1 wherein the collar is selected from a set of collars of different diameters, each collar being formed to fit an appropriate sized bearing.

3. The bearing installer/remover of claim 1 wherein the bushing is selected from a set of bushings of different diameters, each bushing being formed to fit an appropriate sized bearing.

4. The bearing installer/remover of claim 1 wherein the bolt, collar and bushing are separate pieces.

5. The bearing installer/remover of claim 1 wherein a setscrew secures the collar to the bolt shaft.

6. The bearing installer/remover of claim 1 wherein a setscrew secures the bushing to the bolt shaft.

7. The bearing installer/remover of claim 1 wherein the collar and bushing are integral.

8. The bearing installer/remover of claim 1 wherein the bridging piece is rectangular and the depending portion comprises two legs, along opposite parallel sides of the bridging piece, each of said legs having a bottom edge with the panel engaging surface and side edges tapering toward one another from said bridging piece to said bottom edge.

9. The bearing installer/remover of claim 1 wherein said collar has an outside diameter larger than the diameter of the bore of the inner race of said bearing but no larger than the inside diameter of the outer race of said bearing.

10. A bearing installer/remover for installing and removing a bearing from a panel having a bearing seating passage through it, said bearing having inner and outer races and a bore through the inner race, comprising:

a bridge, said bridge having a central bridging piece with a top face and, integral with said central bridging piece, depending legs, each with a panel-engaging surface opposite the top face, the engaging surfaces being adapted to engage a surface of said panel astride said bearing and being spaced from and parallel to the top face of the bridging piece and the central bridging piece having a threaded hole therethrough, perpendicular to said top face;

a bolt including a shaft and a head, at least a portion of the shaft being threaded with a thread sized complementarily to the threaded hole in the bridging piece and threaded therethrough, said bearing being positioned between the bolt head and the bridging piece;

a cylindrical collar with an outside diameter larger than the diameter of the bore of the inner race but no larger than the outside diameter of the inner race of said bearing, said collar having a passage with a diameter closely but slidably to receive said bolt shaft, said collar being mounted on said bolt shaft between said bolt head and said inner race and adapted flatly to engage a radial face of the inner race of said bearing, and, integral with said collar, a cylindrical bushing with an outside diameter sized to fit closely but slidably within the bore of said bearing and an inside diameter to fit closely but slidably around said bolt shaft, said bushing being mounted with said collar on said shaft and extending through the bore of said bearing, whereby the bearing is restrained against cocking.

* * * * *